(12) United States Patent
Fuhrmann et al.

(10) Patent No.: US 7,724,495 B2
(45) Date of Patent: May 25, 2010

(54) ROLLED FILM CAPACITOR

(75) Inventors: Henning Fuhrmann, Zurich (CH); Joerg Ostrowski, Zurich (CH); Johan Mood, Ludvika (SE)

(73) Assignee: Abb Research Ltd, Zurich (CH)

( * ) Notice: Subject to any disclaimer, the term of this patent is extended or adjusted under 35 U.S.C. 154(b) by 0 days.

(21) Appl. No.: 12/487,358

(22) Filed: Jun. 18, 2009

(65) Prior Publication Data
US 2009/0268368 A1 Oct. 29, 2009

Related U.S. Application Data

(63) Continuation of application No. PCT/CH2006/000725, filed on Dec. 21, 2006.

(51) Int. Cl.
*H01G 4/32* (2006.01)
(52) U.S. Cl. ............ 361/301.5; 361/303; 361/305; 361/301.3; 361/311; 361/312
(58) Field of Classification Search .......... 361/301.5, 361/301.4, 303–305, 311–313, 301.2, 321.4, 361/321.2, 306.1, 306.3
See application file for complete search history.

(56) References Cited

U.S. PATENT DOCUMENTS

| | | | |
|---|---|---|---|
| 4,348,714 A | | 9/1982 | Wallace |
| 5,057,967 A | | 10/1991 | Den et al. |
| 5,442,516 A | | 8/1995 | Moncrieff |
| 5,757,607 A | * | 5/1998 | Folli .......................... 361/273 |
| 5,905,628 A | * | 5/1999 | Okuno et al. ............... 361/303 |
| 6,212,057 B1 | * | 4/2001 | Kohara et al. ............. 361/301.4 |
| 6,728,092 B2 | * | 4/2004 | Hunt et al. .................. 361/303 |
| 6,754,065 B2 | * | 6/2004 | Carlen et al. ................ 361/303 |

(Continued)

FOREIGN PATENT DOCUMENTS

DE 198 06 586 A1 8/1999

(Continued)

OTHER PUBLICATIONS

Form PCT/ISA/210 (International Search Report) dated Aug. 28, 2007.

(Continued)

*Primary Examiner*—Nguyen T Ha
(74) *Attorney, Agent, or Firm*—Buchanan Ingersoll & Rooney PC

(57) ABSTRACT

A rolled film capacitor is disclosed which includes a first dielectric film and a second dielectric film, which are wound along their length dimension to form alternating turns of the winding. A plurality of first conductive segments are arranged on a first surface of the first dielectric film along the length dimension of the first dielectric film, and a plurality of second conductive segments are arranged on a surface of the second dielectric film along the length dimension of the second dielectric film, or on a second surface of the first dielectric film along the length dimension of the first dielectric film. The first conductive segments can have a progressively increasing length along the length dimension of the first dielectric film, and the second conductive segments have a progressively increasing length along the length dimension of the first or second dielectric film. The number of the first and/or second conductive segments per turn of the winding can be equal to or more than one.

17 Claims, 5 Drawing Sheets

U.S. PATENT DOCUMENTS 6,806,553 B2 * 10/2004 Yashima et al. ............. 257/532
6,963,476 B2 * 11/2005 Chang ........................ 361/104

FOREIGN PATENT DOCUMENTS

| EP | 0 052 451 A2 | 5/1982 |
| EP | 0 225 822 A1 | 6/1987 |
| EP | 0 640 996 A1 | 3/1995 |
| EP | 0 838 078 A1 | 4/1998 |
| GB | 2 276 765 A | 10/1994 |
| JP | 4-057312 A | 2/1992 |
| WO | WO 97/03452 A1 | 1/1997 |

OTHER PUBLICATIONS

Form PCT/ISA/237 (Written Opinion of the International Searching Authority) dated Aug. 28, 2007.

J. Ostrowski et al., "Electric 3D-Simulation of Metallized Film Capacitors", SAM Seminar for Applied Mathematics, Research Report No. 2006-02, Jan. 2006, pages Abstract, 1-16, ETH Eidgenössische Technische Hochschule Zurich, Swiss Federal Institute of Technology Zurich.

Form PCT/IB/373 (International Preliminary Report on Patentability) dated Jun. 23, 2009.

* cited by examiner

ROLLED FILM CAPACITOR

RELATED APPLICATION

This application claims priority as a continuation application under 35 U.S.C. §120 to PCT/CH2006/000726 filed as an International Application on Dec. 20, 2006 designating the U.S., the entire content of which is hereby incorporated by reference in its entirety.

FIELD

The present disclosure relates to a rolled film capacitor, such as a capacitor having plural conductive segments arranged on a surface of a dielectric film, and to a method for producing the same.

BACKGROUND INFORMATION

The capacitance of capacitors generally can reduce over time (e.g. due to self-healing, corrosion, or some other aging effects). This reduction may occur inhomogenously, such that after some time, some parts of the capacitor may have lost more capacitance than other parts. Similarly, if multiple capacitors or capacitor segments are connected either in parallel or in series, after some time, some of these capacitors or segments may have lost more capacitance than others.

Rolled film capacitors having internal series connections are known. In these capacitors, a metallization layer, which is provided on a surface of the rolled film, is divided in a lateral direction (i.e. orthogonal to the winding direction), such as to form multiple separate electrodes. Thereby, two or more series connected capacitors are formed in a single winding, such as with some of the electrodes floating, (i.e., being electrically unconnected to terminals). The floating electrodes subdivide the potential drop between two electrodes connected to opposite leads.

It is in some cases desired to divide the metallization layer also in the longitudinal direction (i.e. in the winding direction) into segments, which are separated by insulating regions. For example, U.S. Pat. No. 5,057,967 describes a rolled film capacitor with a metal electrode pattern including a number of rectangular island electrodes mutually separated by a plurality of lateral and longitudinal insulating gaps and regularly arrayed in both directions. Further capacitors are known from EP 0 225 822, DE 198 06 586, EP 0 640 996, GB 2276765, EP 0 838 078, U.S. Pat. No. 4,348,714, and U.S. Pat. No. 5,442,516. All of the disclosure of these documents are incorporated herein by reference in their entireties.

The segmentation of commercially available metallized films is can be made as follows: Oil or a similar substance is transferred onto the film surface in a regular pre-determined pattern. Then, metal is evaporated and deposited for forming the segments. Since the metal can only be deposited wherever there is no oil on the surface, the regions covered by the oil remain insulating and thus divide the segments. The oil can be applied using a printing roll having a fixed circumference. The printing roll rolls in the longitudinal direction of the film, which is to become the winding direction of the capacitor. Hence, all patterns are self-repeating in the winding direction with a period of the circumference of the printing roll.

In the above capacitor, the distribution of currents and voltages in the winding and, hence, the voltage levels may vary considerably among the segments if their capacitance becomes inhomogeneous. This can have consequences on the lifetime performance of the capacitor. For example, if a segment becomes damaged and loses a considerable amount of its capacitance, high overvoltages may occur in regions near the damaged segment. These overvoltages may accelerate the aging of these near regions and finally damage them as well. Even if the segments are connected by narrow metal bridges known as gates, the above consequences can still occur, at least after the fuse gates have melted.

SUMMARY

A rolled film capacitor is disclosed comprising a first dielectric film and a second dielectric film, which are each wound along their length dimension to form alternating turns of the winding; a plurality of first conductive segments, which are arranged on a first surface of the first dielectric film along the length dimension of the first dielectric film; and a plurality of second conductive segments, which are arranged on a surface of the second dielectric film along the length dimension of the second dielectric film, or which are arranged on a second surface of the first dielectric film along the length dimension of the first dielectric film, the second surface being opposite to the first surface of the first dielectric film; wherein the first conductive segments have a progressively increasing length along the length dimension of the first dielectric film, and the second conductive segments have a progressively increasing length along the length dimension of the first or second dielectric film, wherein a number of the first and/or second conductive segments per turn of the winding is equal to or more than one, and wherein an end of a first conductive segment and/or a second conductive segment is arranged periodically in terms of a winding angle.

A method is disclosed for producing a rolled film capacitor, the method comprising: winding each of a first and a second dielectric film along their length dimension into a winding, each winding being rotated around a winding axis; determining a plurality of division positions along the length dimension of the first dielectric film as functions of an angle of rotation of the winding being rotated around the winding axis; and arranging a first layer on a surface of the first dielectric film, and dividing that first layer at division positions into a plurality of conducting segments.

BRIEF DESCRIPTION OF THE DRAWINGS

The disclosure will be better understood by reference to the following description of embodiments of the disclosure taken in conjunction with the accompanying drawings, wherein.

DETAILED DESCRIPTION

Figure 1:
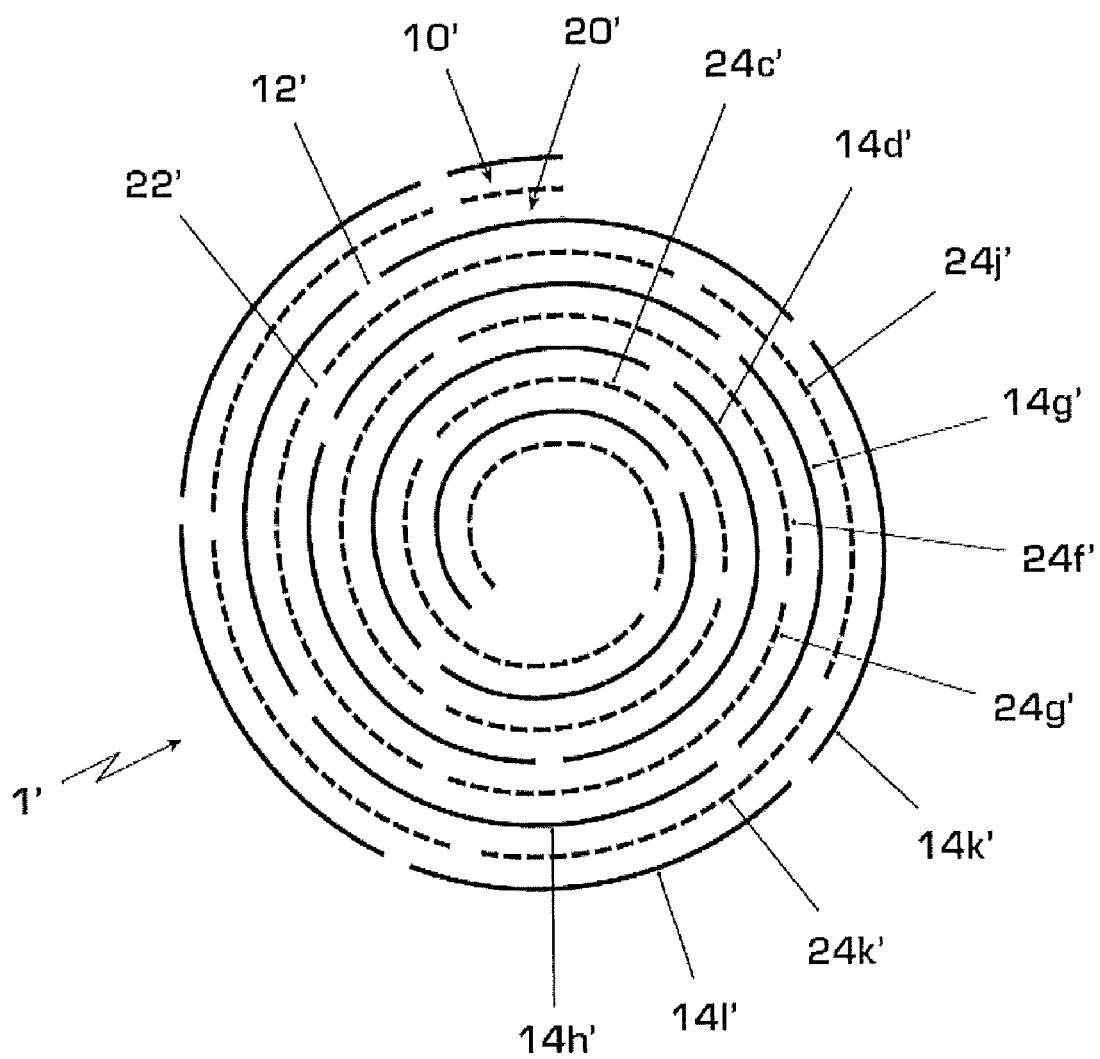
FIG. 1 shows a known rolled film capacitor.

Exemplary embodiments are directed to a rolled film capacitor and a method for producing a rolled film capacitor. Exemplary embodiments can improve the reliability, the lifetime, and/or the predictability of the lifetime of a rolled film capacitor. High and/or unpredictable voltages, such as overvoltages and overvoltage peaks in the capacitors can, for example, be addressed.

According to an aspect of the disclosure, a rolled film capacitor comprises a first dielectric film and a second dielectric film, which are wound along their length (e.g., along a respective length dimension of the dielectric films), into a winding. The first and second dielectric films are wound into each other or form alternating turns of the winding. A plurality of first conductive segments are arranged on a first surface of the first dielectric film along the length dimension of the first dielectric film, and a plurality of second conductive segments are arranged on a surface of the second dielectric film along the length dimension of the second dielectric film, or on a second surface of the first dielectric film along the length dimension of the first dielectric film, the second surface being opposite to the first surface of the first dielectric film. The first conductive segments can have a progressively increasing length along the length dimension of the first dielectric film, and the second conductive segments can have a progressively increasing length along the length dimension of the first or second dielectric film, respectively. The number of first and/or second segments per turn of the winding can be equal to or more than one. For example, the second conductive segments are electrically insulated from the first conductive segments (e.g., by the first dielectric film and/or by the second dielectric film).

According to a further aspect of the disclosure, a method is disclosed for producing a rolled film capacitor and includes: winding a first and a second dielectric film along a length dimension of the films (e.g., as alternating turns), into a winding, whereby during production the winding is rotated around a winding axis. A plurality of division positions along the length dimension of the first dielectric film are determined, respectively, as functions of an angle of rotation of the winding being rotated around the winding axis. A first layer, which is arranged on a surface of the first dielectric film, is divided at the division positions into a plurality of conducting segments.

The start (i.e., beginning) end of any first segment may be offset with respect to a respective opposing start end of a second segment by an offset x being in a predetermined offset range, or by an offset x of about half of the length of a respective first segment. The first conductive segments and/or the second conductive segments may be arranged periodically in terms of a winding angle. For example, the winding angle can be defined around a central axis of the winding. The period may be independent of the turn. There may be n first segments per turn or even per any turn of the first dielectric film in the winding, with n being any real number (e.g., n being larger or equal to 1, and, for example, being a natural number). Likewise, there may be n second segments per turn or even per any turn of the second dielectric film in the winding.

The disclosure is also directed to apparatuses for carrying out the disclosed methods and including apparatus parts for performing each described method step. The method steps may be performed by way of hardware components, a computer programmed by appropriate software, by any combination of the two or in any other manner. Furthermore, the disclosure is also directed to methods by which the described apparatus operates. It includes method steps for carrying out each function of the apparatus or manufacturing each part of the apparatus.

FIG. 1 shows a cross-sectional view of an exemplary rolled film capacitor 1' with a segmentation as known in the art. Films 10' and 20' are wound into each other to form a winding of a rolled film capacitor 1'. On each of the films 10' and 20', segments 14d', 14g', 14h', etc. and 24c', 24f', 24g', etc. have the same length (deviations due to the schematic nature of FIG. 1 are possible). Further, they are arranged periodically in terms of a length along the respective film. These segments are divided from each other by insulating divisions 12', 22', the divisions being arranged periodically in terms of a length of the respective film 10' or 20' as well. In the following, the term "segment" will be used to, for example, reference a piece of conductive material that is delimited by two insulating divisions at different length positions. The segments of film 20' can be electrically isolated from the segments of film 10' by the films 10' and 20'.

The segments are sub-divided in a lateral direction by insulating regions, such that a number of electrode islands is created. Some of the electrode islands are connected to external terminals for receiving some fixed voltages, and some other electrode islands are floating, thereby creating internal series connections as known e.g. from U.S. Pat. No. 5,057,967. For definiteness it is assumed that the segments are laterally sub-divided in analogy to FIGS. 4 and 5 below, each segment of film 10' being subdivided into four electrodes, and each segment of film 20' being subdivided into three electrodes. The outermost two electrodes of each segment of film 10' are, for example, each attached to respective external terminals, and all other electrodes are floating.

Because the diameter of the winding changes with each turn, the arrangement of the segments is non-periodic in terms of the winding angle around a central axis of the winding. Moreover, the segments are misaligned with respect to each other (i.e. there is no fixed offset (in terms of absolute length or relative to a length of a segment) between the segments of film 10' and the segments of film 20').

In the following, an exemplary case is discussed wherein a segment becomes damaged. For definiteness, it will be assumed that the segment 14g' of film 10' is heavily damaged and has lost almost all its capacitance, whereas the other segments have full capacitance. Thus, in the damaged segment 14g', only a fraction of the nominal surface charge can accumulate. The segments of Film 20' that overlap at least partially with the damaged segment 14g' are the segments 24f', 24g', 24j' and 24k'. It has been found empirically that these segments show a particularly increased aging and thus are likely to becoming damaged themselves.

For a qualitative explanation of this effect, it will first be assumed that all segments other than the damaged segment 14g' and the directly adjacent segments 24f', 24g', 24j' and 24k' remain at nominal potential.

Segment 24j' overlaps almost entirely with the damaged segment 14g', which is its nearest neighbor towards the inside of the winding. Since the surface charge at segment 14g' is small, very little charge will be induced on segment 24j' from the inside. On the other hand, since the next outward segment 14k' is assumed to be charged normally, it will induce some charges onto segment 24j' from the other side. Nevertheless, the total amount of induced charges on segment 24j' will be diminished (e.g., drastically reduced), and segment 24j' may not therefore achieve its nominal potential. Consequently, the voltage between segments 14k' and 24j' can be much higher than nominal.

In contrast, segment 24k' has only a small overlap with the damaged segment 14g'. Instead, most of its inner surface faces segment 14h', which is assumed to be at nominal potential. Therefore, almost the entire nominal charge is induced in segment 24k'. Hence, the voltage between segments 14l' and 24k' will be close to the nominal value.

Following the same argumentation, moderately increased voltages can be expected between segments 14d' and 24g', and between segments 14d' and 24f'.

If the above assumption (that the potential of only the directly adjacent segments may change) is relaxed, then the voltage distribution of the entire winding may be determined numerically (e.g. by a calculation as outlined in J. Ostrowski, R. Hiptmair, H. Fuhrmann, "Electric 3D Simulation of Metallized Film Capacitors" available on the Internet at http://www.sam.math.ethz.ch/reports/2006, the disclosure of which is hereby incorporated by reference in its entirety). Such a calculation takes into account that the above-explained increase in voltage between segments 14g' and 24f' can lead, in turn, to additional induced charges on segments 24f' and 14g', which again can lead to additional induced charges on further segments etc. Such a calculation was carried out by the inventors. As a result, in an exemplary embodiment, potentials of closest neighbor segments to the damaged segment 14d' (e.g., segment 24f') were found to deviate most from the nominal potential, thereby confirming the assumption used in the above qualitative explanation. The maximum voltage between opposing segments was consequently found in the region near the damaged segment, and was found to be significantly larger than the nominal voltage (more than 130% of the nominal voltage). This explains the tendency of these segments to age and hence to lose their capacitance more quickly.

Figure 2:
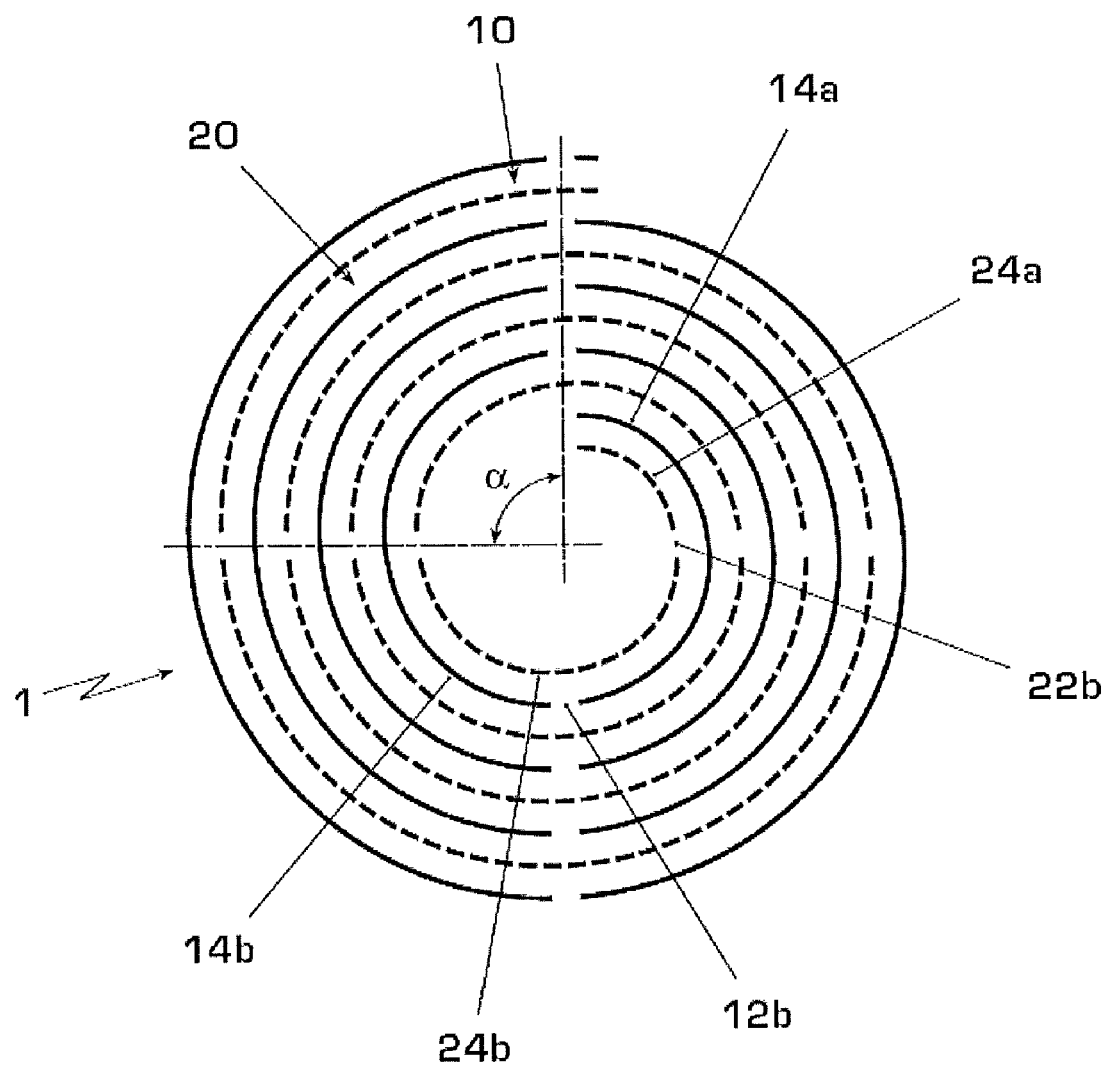
FIG. 2 shows an exemplary rolled film capacitor according to the present disclosure.
Figure 4:
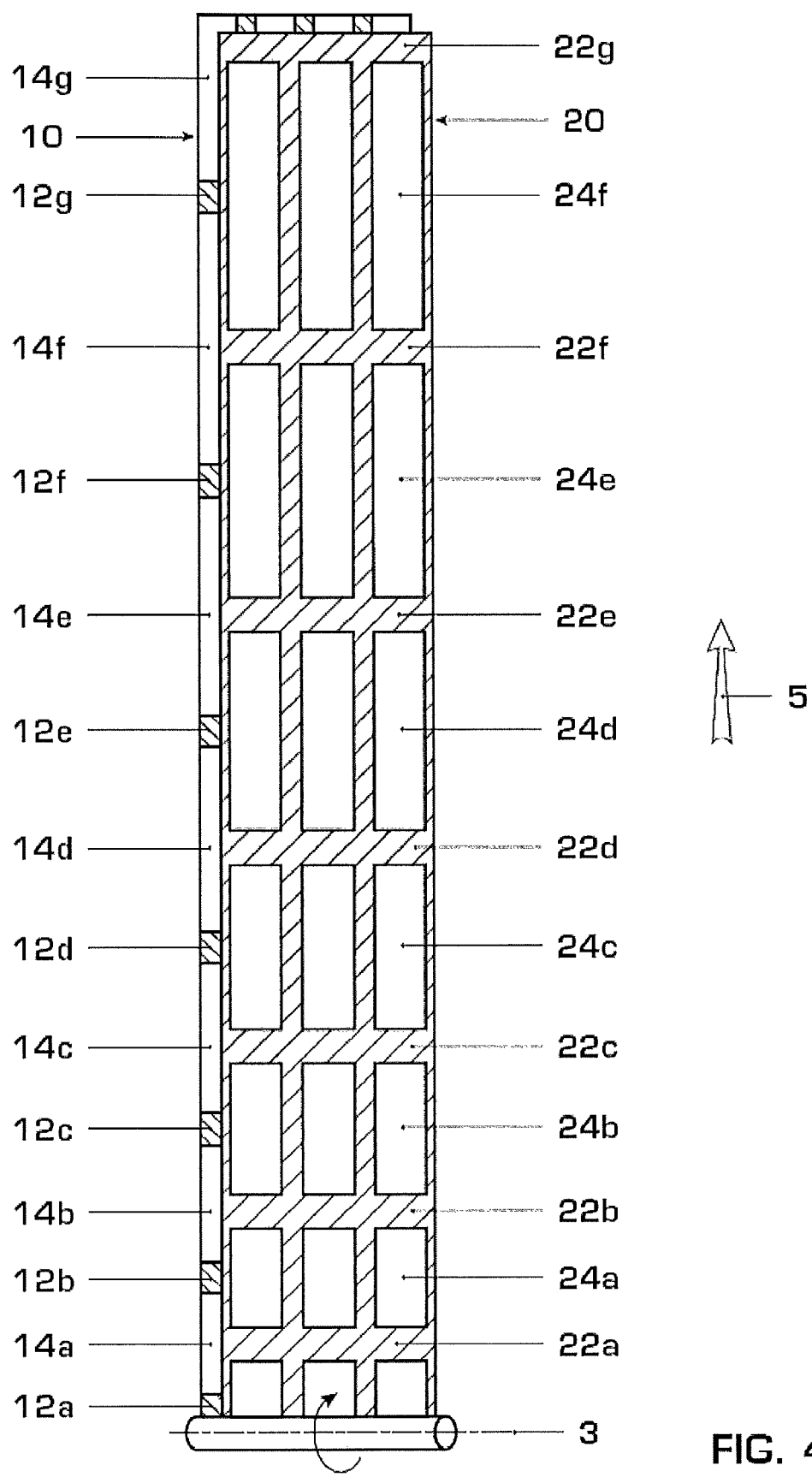
FIGS. 4 and 5 show an exemplary method of manufacturing a rolled film capacitor.
Figure 5:
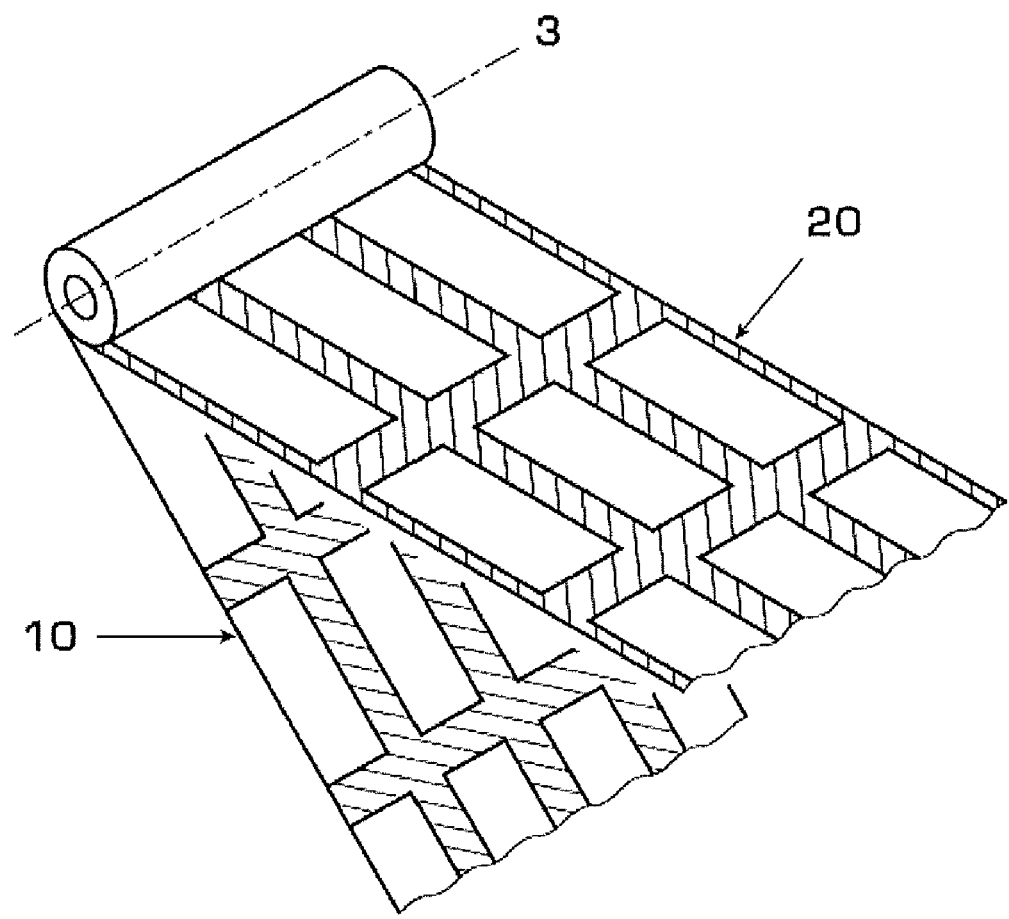

An exemplary rolled film capacitor 1 according to the present disclosure is shown in FIG. 2. Except for the aspects described below, the rolled film capacitor 1 may be generally constructed similarly to the capacitor 1' of FIG. 1. For example, it has films 10 and 20 with respective segments 14a, 24a, 24b, etc, which are divided from each other by respective insulating divisions (e.g. 12b, 14b). For clarity, the films 10 and 20 are not shown in detail in FIG. 2. They are shown in FIGS. 4 and 5. The films 10 and 20 are dielectric for electrically insulating the segments 14a, 14b, etc. from the segments 24a, 24b, etc. Further, the segments may be sub-divided, in a lateral direction, into electrode islands, and for definiteness it is assumed that the segments are laterally sub-divided as is shown and described in connection with FIG. 4 below. However, the effects that are discussed below are not restricted to any particular arrangement of floating and non-floating segments.

In the exemplary rolled film capacitor 1 of FIG. 2, the segments 14a, 14b, etc. of film 10 have a progressively increasing length along the length dimension of the film 10 (i.e. along the winding direction). Likewise, the segments 24a, 24b, etc. of film 20 have a progressively increasing length along the length dimension of the film 20. Further, the lengths of the segments 14a, 14b, 24a, 24b, etc. of the rolled film capacitor 1 are arranged regularly in terms of the winding angle. Namely, the segments are arranged such that there are two segments per any turn of the respective film. Further, the segments are periodic in terms of a winding angle around a central axis of the coil. In other words, each segment can cover the same predetermined winding angle.

Thereby, a relatively regular and predictable voltage distribution can be achieved, which promotes a relatively predictable and/or uniform aging of the capacitor. This is in contrast to the arrangement of FIG. 1, where the segments are periodic in terms of length, not of winding angle, and therefore have an irregular pattern in terms of winding angle.

Further, the segments 14a, 14b, etc of the first film 10 and the segments 24a, 24b, etc of the film 20 are, for example, aligned with respect to each other. More precisely, any end (e.g., start) of a segment of the film 10 is offset with respect to a respective inwardly or outwardly opposing end (e.g., start or finish) of a segment of the film 20 by a predetermined offset. The same of course can be applied to a finish end of a segment of the film 10, which is offset with respect to a respective inwardly or outwardly opposing start or finish end of a segment of the film 20 by a predetermined offset. Thereby, at least a plurality of the first conductive segments (14a, 14b) and at least a plurality of the second conductive segments (24a, 24b) overlap each other. The offset may be defined by an offset angle α, as shown in FIG. 2. In FIG. 2, the offset angle α is set to 90°. The offset can also be determined by a certain fractional offset (i.e., a fraction of the length of the segment being offset). In FIG. 2, the fractional offset is, for example, ½ (i.e. each segment of the film 10 is offset with respect to a respective opposing segment of film 20 by approximately half of the length of the segment of the film 10). The number n of segments per turn, the offset angle α, and the fractional offset x can, for example, be related by the equation $$\alpha=(x/n)*360°. \quad (1)$$

A fractional offset can be about ½. Thus, for example, 3 segments per turn and α=60°, or 4 segments per turn and α=45 can be employed in accordance with exemplary embodiments of the disclosure.

Here and in the following, the offset is defined only taking into account the lengthwise direction (winding direction). A potential further displacement in a lateral direction is not considered according to this definition of an offset. Further, the offset may depend on a particular choice of a cross-sectional plane. The segment lengths may be defined using any cross-sectional plane, for example, a cross-sectional plane orthogonal to a winding axis of the winding. Further, if there are any isolating regions between two segments, equal parts of these isolating regions can be added to their respective nearest neighboring conductive segment for the purpose of defining the offset (as is shown in FIG. 2).

In the coil of FIG. 2, in which the fractional offset x is about ½, a given segment belonging to one of the films 10 or 20 has, on each side (inwards or outwards) two opposing segments of the respective other film. Each of these segments has an overlap of 50% of the length of the given segment on the respective side, and therefore 25% of the total surface (taking into account both sides of the segment, neglecting the surface area of insulating divisions such as 12b, 22b, and considering only the cross-sectional plane of FIG. 2) or of a length dimension of the surface. Thus, if any one segment is damaged, 75% of the surfaces or lengths of the neighboring segments will face a neighbor, which is at approximately nominal potential (according to the assumption used in the above qualitative discussion). Thus, no single neighboring segment is too dominantly influenced by the damaged segment. Instead, four segments are affected equally by a smaller amount. Further, each of these four segments can, in turn, convey the voltage disturbance to other three segments, Thus, the winding rather has a slightly disturbed voltage distribution for a large number of segments, instead of showing a highly disturbed voltage for just a few segments. In other words, the voltage inhomogeneity induced by the damaged segment can be distributed over a relatively large portion of the winding and thereby diluted, instead of being concentrated in a small portion.

The arrangement shown in FIG. 2 is a special case of more general arrangements, which also fall under the scope of the present disclosure. For example, the number of segments per each turn of one of the films 10 and/or 20 may be chosen to be any predetermined real number n that is greater than or equal to one, and the offset may be chosen arbitrarily.

Further, the segments may be arranged not only periodically in terms of winding angle (as shown in FIG. 2), but also non-periodically. For example, a fractional offset may be chosen as a predefined range, e.g. the range from 10% to 90%, such that each segment of film 10 is offset with respect to a respective opposing segment of film 20 by an offset being in the predefined range relative to the segment of film 10 in question. Further possible ranges for the fractional offset are between 35% and 65% or in a further exemplary embodiment between 45% and 55%. For example, the fractional offset can be about ½, where "about" is defined to include a tolerance of ±5%. In an exemplary embodiment, the fractional offset can be chosen to be ½ or in a range that is centered about the value ½, although this is not necessary for carrying out the disclosure.

Further, the segments 14, 24 may be arranged on two opposing surfaces of one film, such as the inside and outside surface of the first film 10, whereas in an exemplary embodiment, there are no segments on the surface of the other second film 20. Alternatively, in a further embodiment, there may be segment portions arranged on the inside surface and the outside surface of the first film 10, and there may be further segment portions arranged on the inside surface and the outside of the second film 20. A segment portion on the inside surface of film 10 and a corresponding segment portion on the outside surface of film 20 are in electrical contact and combine to a segment 14. The divisions adjacent to both segment portions are at the same angular positions of the winding, such that neighboring segments are electrically insulated from one another. Likewise, a segment portion on the outside surface of film 10 and a corresponding segment portion on the inside surface of film 20 are in electrical contact and combine to a segment 24. This exemplary embodiment can have an advantage that the segments 14 and 24 are arranged on the surface of both films 10 and 20. Thereby, possible cavities between a segment and an adjacent dielectric can be reduced. Consequently, the risk of partial discharges across cavities can be reduced.

Figure 3:
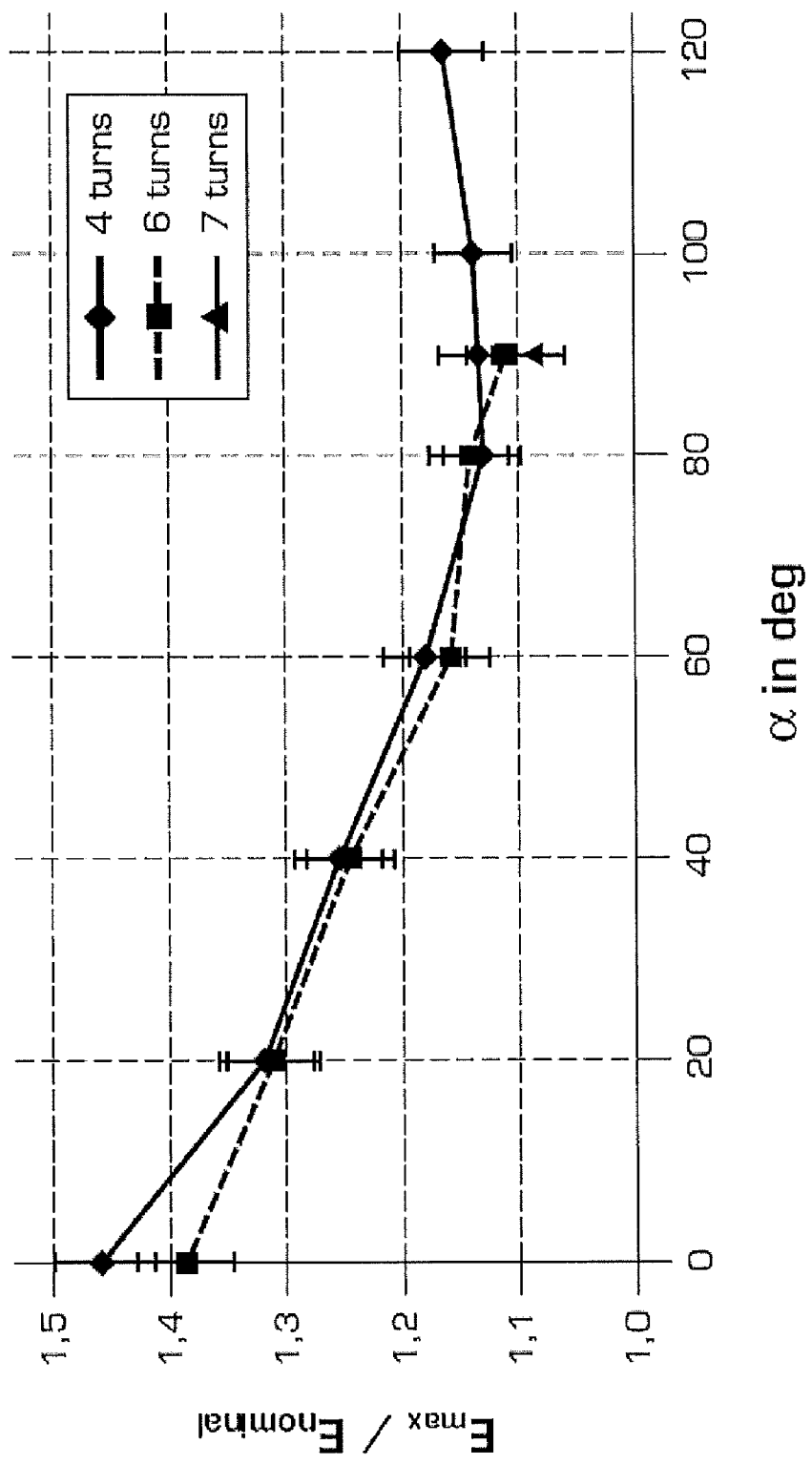
FIG. 3 is a diagram of an exemplary maximum field as a function of the offset angle $\alpha$.

FIG. 3 is a diagram of an exemplary maximum field in the winding after total damaging of one segment. The maximum field is plotted, in units of the nominal AC field, as a function of the offset angle $\alpha$. FIG. 3 is the result of a numerical calculation according to an exemplary method of the above-cited Fuhrmann publication. Herein, the number n of segments per turn is held fixed at n=2 (as shown in FIG. 2), and the parameter $\alpha$ is varied (horizontal axis). Consequently, in accordance with Eq. (1), the fractional offset x is varied. The maximum field is plotted, on the vertical axis, for 4 turns, 6 turns (for different offset angles $\alpha$), and for 7 turns (for $\alpha=90°$ only).

The maximum field is found to decrease with increasing offset angle $\alpha$ from $\alpha=0°$ to $\alpha=90°$, reaching a minimum at $\alpha=90°$ (for 6 turns). Thus, the fractional offset x=½, corresponding to $\alpha=90°$ can be used. However, any offset $\alpha \geq 20°$ (and $\leq 160°$), roughly corresponding to the interval 10%<x<90% for the fractional offset x, is found to lead to a reduction in the maximum field. Further, all of the offsets shown in FIG. 3 (including the offset 0) can have an advantage that the maximum relative overlap of any potentially failing segment of any of the films 10 and/or 20 with any of its neighboring segments in the other respective film is known, regardless which segment fails. Hence, the resulting overvoltages are thus in a known or predictable range. This also holds true for any offset range.

Although the results shown in FIG. 3 are obtained for a relatively small number of turns, the results are considered valid for much larger numbers of turns as well (e.g. for more than 10 turns, more than 50 turns, and even more than 100 turns). This can be inferred from the fact that the calculated results, taking the error bars shown in FIG. 3 into account, are seen to be not too dependent on the number of turns. Further, symmetry considerations suggest that the minimum field should be at x=½ (neglecting boundary effects), thus confirming the main qualitative result of the calculations of FIG. 3.

In the following, referring to FIG. 4, an exemplary method of manufacturing a capacitor is described. A first and a second dielectric film 10 and 20 are provided. The films can, for example, comprise an electrically insulating polymer (e.g., polyethylene, polystyrole, polypropylene, polycarbonate, polyimide, polyethyleneterephtalate (PET), polyethylenenaphtalate (PEN), polyester, epoxy resin, polysulfone or a mixture of such polymers possibly also containing additives and suitable for forming a thin film with high dielectric strength). The first and second films 10 and 20 form elongated strips of approximately constant width, but not necessarily constant width. Their thickness can, for example, be between 1 µm and 20 µm, or lesser or greater.

The dielectric first and second films 10 and 20 can be partially or fully coated by a coating of electrically conductive material. The coating can comprise, for example, metal, and is, for example, a metallization applied by vapour deposition, but use of other electrically conductive materials beside metals (e.g., carbon or a semiconducting material), is also possible.

The first and a second dielectric film 10 and 20 are wound, along a length dimension 5 of the films 10 and 20, as alternating turns into a winding, by rotating during production the winding around a winding axis 3. In order to divide consecutive segments as a function of the winding angle (and not of length), a plurality of division positions along the length dimension of the first dielectric film 10 can be determined, respectively, as functions of an angle of rotation of the winding being rotated around the winding axis 3. Then, the conductive layer can be selectively removed at these division positions, thereby creating insulating regions or divisions 12a-g, 22a-g. As a consequence, segments are created, which are electrically insulated from each other by these divisions 12a-g, 22a-g.

The conductive layer may be removed by any known technique (e.g. by using a laser or a spark-roller). A spark roller is a roll with a wire being arranged parallel to the roll axis on its surface. A high voltage can be applied to the wire, which removes the conductive layer from any portion of the film that is in contact with the wire, leaving behind transverse insulating interstices or gaps, i.e. divisions. Thereby, division positions are defined at those length positions of the film, at which the film comes into contact with the wire. The spark-roller rotates in sync with the partially finished winding. In order to avoid sliding of the spark roller surface along the surface of the respective film 10 or 20, the spark roller can, for example, be at a small distance from the surface of the respective film. The transverse insulating interstices form divisions 12a-g, 22a-g, which divide the conductive layer of the respective film 10 or 20 at the division positions into a plurality of conducting segments 14a-g, 24a-f.

In an exemplary variant of the above method, the conductive layer is applied in the form of pre-divided segments onto the respective film 10 or 20. The conductive layer may be applied by any known method (e.g. by a printing technique using an electrically conductive ink). The conductive layer may be applied either in a separate process from the rolling of the capacitor, or together with the rolling of the capacitor. The pre-divided segments have an increasing length, for example, such that the number of segments per turn of the winding will be constant. Thus, the steps of arranging the layer on the surface of the film and the step of dividing the layer into a plurality of conducting segments may be performed at the same time. In any case, the plurality of segments is, for example, at least four segments or at least ten segments. The segments can, for example, follow one upon the other in the length direction.

FIG. 5 shows a similar method to the method of FIG. 4. Herein, the films 10 and 20 are stacked one on top of the other when being wound into a roll. Thereby, both films are easily accessible (e.g. for arranging the conductive layers or for dividing the layers into segments). In FIG. 5, the segments of film 20 are laterally displaced with respect to the segments of film 10 by about 10% of their length. Thus, the fractional displacement is, for example, x=0.1.

In FIGS. 4 and 5, the segments 14a-g are shown to be laterally sub-divided by insulating regions into four electrodes per segment. The outer two electrodes extend to the edge of film 10 and are to be connected to terminals. The inner two electrodes are adapted to be floating. Similarly, the segments 24a-f are laterally sub-divided into three floating electrodes. The segments may also be patterned as, for example, described in EP 0 225 822 A1, using quadratic patches separated by uncoated strips, which are connected by thin bridges of coating at the corners. The electrical conductivity of the coating may be relatively low (e.g. its surface resistivity may be at least 1 Ω/square).

Any other number of lateral sub-divisions is possible, and it is possible that the non-floating terminal electrodes are located on film 20 or on both films 10 and 20. Also, segments having only floating electrodes are possible. Further, in contrast to the arrangement shown in FIG. 4 the segments may not be laterally subdivided, and a graded or uniform conductive coating can be used. For example, a high-voltage capacitor may be provided with an inner conductive cylinder and an outer conductive cylinder serving as terminal electrodes. The cylinders are, then, concentrically arranged with the rolled-film arrangement 1 shown in FIG. 2 arranged between them. In this capacitor, all electrode segments 14 and 24 of the rolled-film arrangement 1 are floating.

Further combinations of floating and non-floating segments are possible. For example, all segments of film 10' may be connected to a first terminal for receiving a voltage, and all segments of film 20' may be connected to a second terminal for receiving a voltage of opposite sign. Alternatively, some, but not all of the segments may be floating.

Further, the segments may be electrically connected to neighboring segments of the same film by means of thin metal bridges or fuse gates. Alternatively, the neighboring segments may be electrically insulated from each other.

The capacitor may be dry or impregnated. The capacitor is, for example, self-healing. The wound film capacitor may be cylindrical or flat-pressed in shape.

This written description uses examples to disclose the disclosure, including the best mode, and also to enable any person skilled in the art to make and use the disclosure. While the disclosure has been described in terms of various specific embodiments, those skilled in the art will recognize that the disclosure can be practiced with modification within the spirit and scope of the claims. For example, the dimensions, shapes and arrangement of the segments and their electrical properties as well as the dimensions and properties of the base may vary widely depending on the specific purposes of the capacitor. Further, mutually non-exclusive features of the embodiments described above may be combined with each other.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rolled film capacitor comprising:
   a first dielectric film and a second dielectric film, which are each wound along their length dimension to form alternating turns of the winding;
   a plurality of first conductive segments, which are arranged on a first surface of the first dielectric film along the length dimension of the first dielectric film; and
   a plurality of second conductive segments, which are arranged on a surface of the second dielectric film along the length dimension of the second dielectric film, or which are arranged on a second surface of the first dielectric film along the length dimension of the first dielectric film, the second surface being opposite to the first surface of the first dielectric film;
   wherein the first conductive segments have a progressively increasing length along the length dimension of the first dielectric film, and the second conductive segments have a progressively increasing length along the length dimension of the first or second dielectric film, wherein a number of the first and/or second conductive segments per turn of the winding is equal to or more than one, and wherein an end of a first conductive segment and/or a second conductive segment is arranged periodically in terms of a winding angle.

2. The rolled film capacitor according to claim 1, wherein at least a plurality of the first conductive segments and at least a plurality of the second conductive segments overlap each other.

3. The rolled film capacitor according to claim 2, wherein a start end of each of a plurality of the first conductive segments relative to a start or finish end of each of a plurality of the second conductive segments are offset in the length dimension with respect to each other by an offset, the offset being in a predetermined offset range.

4. The rolled film capacitor according to claim 3, wherein there are n first conductive segments per turn of the first dielectric film in the winding, with n being any real number.

5. The rolled film capacitor according to claim 4, wherein n is a rational number or a natural number.

6. The rolled film capacitor according to claim 5, wherein at least some of the first and/or second conductive segments are floating electrodes.

7. The rolled film capacitor according to claim 1, wherein each end of a plurality of the first conductive segments and each end of a plurality of the second conductive segments are offset in the length dimension with respect to each other by an offset, the offset being in a predetermined offset range.

8. The rolled film capacitor according to claim 7, wherein the predetermined offset range is a range from 10% to 90% of a length of a first conductive segment.

9. The rolled film capacitor according to claim 7, wherein the predetermined offset range is a range from 35% to 65% of a length of a first conductive segment.

10. The rolled film capacitor according to claim 7, wherein the predetermined offset range is a range from 45% to 55% of a length of a first conductive segment.

11. The rolled film capacitor according to claim 1, wherein a start end of each of the first conductive segments relative to a start end of each of the second conductive segments are offset with respect to each other by an offset of half of a length of a first conductive segment.

12. The rolled film capacitor according to claim 1, wherein there are n first conductive segments per turn of the first dielectric film in the winding, with n being any real number.

13. The rolled film capacitor according to claim 12, wherein n is a rational number or a natural number.

14. The rolled film capacitor according to claim 1, wherein there are n second conductive segments per turn of the second dielectric film in the winding.

15. The rolled film capacitor according to claim 1, wherein at least some of the first and/or second conductive segments are floating electrodes.

16. The rolled film capacitor according to claim 1, wherein the rolled film capacitor is cylindrical or flat-pressed in shape.

17. Method for producing a rolled film capacitor, the method comprising:

winding each of a first and a second dielectric film along their length dimension into a winding, each winding being rotated around a winding axis;

determining a plurality of division positions along the length dimension of the first dielectric film as functions of an angle of rotation of the winding being rotated around the winding axis; and arranging a first layer on a surface of the first dielectric film, and dividing that first layer at division positions into a plurality of conducting segments.

* * * * *